United States Patent Office 3,652,695
Patented Mar. 28, 1972

3,652,695
PREPARATION OF SUBSTITUTED AROMATIC
COMPOUNDS
George R. Lester, Park Ridge, Ill., assignor to Universal
Oil Products Company, Des Plaines, Ill.
No Drawing. Filed Mar. 18, 1970, Ser. No. 20,810
Int. Cl. C07c 15/02
U.S. Cl. 260—668 A
7 Claims

ABSTRACT OF THE DISCLOSURE

Substituted aromatic compounds containing the same number of carbon atoms as the starting material are prepared in a one-step process by subjecting a geminally-substituted cycloalkane to conversion in the presence of a gold-containing catalyst at elevated temperatures above about 450° C. The process is exemplified by the conversion of 1,1-dimethylcyclohexane to ethylbenzene and o-xylene.

---

This invention relates to a process for the conversion of geminally substituted cycloalkanes to substituted aromatic compounds by treating the cycloalkane in the presence of certain catalytic compositions of matter of the type hereinafter set forth in greater detail. More specifically, the invention is concerned with a one-step process for obtaining substituted aromatic compounds containing the same number of carbon atoms as the starting material which are relatively more important for chemical uses than are the precursor compounds which comprise geminally substituted cycloalkanes.

The substituted aromatic compounds which are prepared according to the process of this invention comprise articles of commerce which, as hereinbefore set forth, occupy a more vital part of chemical processes than do the geminally substituted cycloalkanes. For example, ethylbenzene and o-xylene which may be obtained by the conversion of 1,1-dimethylcyclohexane are useful chemical compounds. Ethylbenzene is useful in organic synthesis; as a solvent and diluent, and more importantly, is used as an intermediate in the production of styrene, the latter compound being known as a component in the preparation of synthetic polymers such as acrylonitrile-butadiene-styrene formulation which is useful as a synthetic rubber. In addition, polystyrene is also useful as a foam, etc. In the usual production of xylenes the isomeric ortho-, meta- and para-xylenes are present as a mixture, the meta- and para-xylenes predominating in the commercial mixture. It is well known that the separation of the three isomers into pure fractions thereof is relatively difficult to accomplish due to the fact that the boiling points of these isomers fall within a relatively low range thus necessitating the use of expensive distillation or crystallization equipment to effect a clean-cut separation. Ortho-xylene which may be prepared according to the process of this invention is useful in vitamin and pharmaceutical synthesis; in the preparation of dyes, insecticides, etc. and also is an intermediate in the manufacture of phthalic anhydride. The latter compound is well known for its use in alkyd resins, polyesters, plasticizers or in the synthesis of phenolphthalein and other dyes, etc. Yet another compound which may be prepared according to the process of this invention comprises diethylbenzene which also may be used as an intermediate in the preparation of other chemical compounds or as a solvent.

It is therefore an object of this invention to provide a process for the conversion of geminally substituted cycloalkanes to more useful chemical compounds.

A further object of this invention is to provide a process for the conversion of geminally substituted cycloalkanes to aromatic compounds having the same number of carbon atoms.

In one aspect an embodiment of this invention resides in a process for the conversion of a geminally substituted cycloalkane to a substituted aromatic hydrocarbon which comprises treating said alkane at conversion conditions in the presence of a gold-containing catalyst, and recovering the resultant substituted aromatic compound.

A specific embodiment of this invention is found in a process for the conversion of 1,1-dimethylcyclohexane by treating said compound at a temperature in the range of from about 450° C. to about 600° C. and a pressure in the range of from about atmospheric to about 100 pounds per square inch in the presence of a catalyst comprising gold composited on alumina, and recovering the resultant ethylbenzene and o-xylene.

Other objects and embodiments will be found in the following further detailed description of the present invention.

As hereinbefore set forth the present invention is concerned with a one-step process for converting a geminally substituted cycloalkane to a substituted aromatic compound containing the same number of carbon atoms as the geminally substituted cycloalkane, said conversion being effected in the presence of certain catalytic compositions of matter of a type hereinafter set forth in greater detail and at conversion conditions which include relatively high temperatures. The geminally substituted cycloalkanes which are converted to substituted aromatic compounds will possess the generic formula:

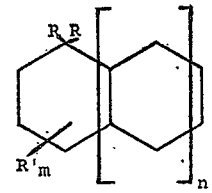

in which R is an alkyl radical of from 1 to 2 carbon atoms, R' is a hydrogen, alkyl of from 1 to 10 carbon atoms, cycloalkyl, halo or alkoxy radical, n is 0 or 1 and m is an intger of from 1 to 10 when n is 0 and from 1 to 16 when n is 1, at least one carbon atom adjacent to the geminally substituted carbon atom containing a hydrogen atom. Some specific examples of these compounds will include 1,1-dimethylcyclohexane,
1,1-diethylcyclohexane,
1,1-dimethyldecahydronaphthalene,
1,1-diethyldecahydronaphthalene,
1,1,3-trimethylcyclohexane,
1,1,3,4-tetramethylcyclohexane,
1,1-dimethyl-3-ethylcyclohexane,
1,1-dimethyl-4-propylcyclohexane,
1,1-dimethyl-3,4-dibutylcyclohexane,
1,1-dimethyl-3-pentylcyclohexane,
1,1-dimethyl-3-cyclopentylcyclohexane, 1,1-dimethyl-3-chlorocyclohexane,
1,1-dimethyl-3,4-dichlorocyclohexane,
1,1-dimethyl-3-bromocyclohexane,
1,1-dimethyl-3,4-dibromocyclohexane,
1,1-dimethyl-3-methoxycyclohexane,
1,1-dimethyl-3-ethoxycyclohexane,
1,1-dimethyl-3,4-dimethoxycyclohexane,
1,1-diethyl-3-methylcyclohexane,
1,1,3-triethylcyclohexane,
1,1-diethyl-3-propylcyclohexane,
1,1-diethyl-4-propylcyclohexane,
1,1-diethyl-3,4-dibutylcyclohexane,
1,1-diethyl-3-pentylcyclohexane,
1,1-diethyl-3-cyclopentylcyclohexane,
1,1-diethyl-3-chlorocyclohexane,
1,1-diethyl-3,4-dichlorocyclohexane,
1,1-diethyl-3-bromocyclohexane,
1,1-diethyl-3,4-dibromocyclohexane,
1,1-diethyl-3-methoxycyclohexane,
1,1-diethyl-3-ethoxycyclohexane,
1,1-diethyl-3,4-dimethoxycyclohexane,
1,1,3-trimethyldecahydronaphthalene,
1,1,3,4-tetramethyldecahydronaphthalene,
1,1-dimethyl-3-propyldecahydronaphthalene,
1,1-dimethyl-3,4-dipropyldecahydronaphthalene,
1,1-dimethyl-3-butyldecahydronaphthalene,
1,1-dimethyl-3,4-t-butyldecahydronaphthalene,
1,1-dimethyl-3-cyclopentyldecahydronaphthalene,
1,1-dimethyl-3-chlorodecahydronaphthalene,
1,1-dimethyl-3,4-dichlorodecahydronaphthalene,
1,1-dimethyl-3-bromodecahydronaphthalene,
1,1-dimethyl-3,4,5-tribromodecahydronaphthalene,
1,1-dimethyl-3-methoxydecahydronaphthalene,
1,1-dimethyl-3,4-dimethoxydecahydronaphthalene,
1,1-dimethyl-3-ethoxydecahydronaphthalene,
1,1-dimethyl-4-propoxydecahydronaphthalene,
1,1-diethyldecahydronaphthalene,
1,1,3-triethyldecahydronaphthalene,
1,1,3,4-tetraethyldecahydronaphthalene,
1,1-diethyl-3-propyldecahydronaphthalene,
1,1-diethyl-3,8-dipropyldecahydronaphthalene,
1,1-diethyl-3,4,5-tributyldecahydronaphthalene,
1,1-diethyl-4,5-dicyclopentyldecahydronaphthalene,
1,1-diethyl-3-chlorodecahydronaphthalene,
1,1-diethyl-3,4-dichlorodecahydronaphthalene,
1,1-diethyl-3,4,5,8-tetrachlorodecahydronaphthalene,
1,1-diethyl-3-bromodecahydronaphthalene,
1,1-diethyl-3,4-dibromodecahydronaphthalene,
1,1-diethyl-3,4,5,8-tetrabromodecahydronaphthalene,
1,1-diethyl-3,4-dimethoxydecahydronaphthalene,
1,1-diethyl-3,4,8-triethoxydecahydronaphthalene, etc. It is to be understood that the aforementioned geminally substituted cycloalkanes are only representative of the class of compounds which may be converted, and that the present invention is not necessarily limited thereto.

The conversion of the aforementioned geminally substituted cycloalkanes to substituted aromatic compounds containing the same number of carbon atoms as the starting material in a one-step operation is effected at conversion conditions which include relatively high temperatures, that is, temperatures in the range of from about 450° to about 600° C. In addition, the pressure at which the conversion is effected will range from atmospheric up to about 1,000 pounds per square inch or more. Generally speaking, superatmospheric pressures are preferred and particularly, that a partial pressure which afforded by the introduction of hydrogen to prevent the carbonation of the catalyst thereby extending the life of the same, may be used. When using superatmospheric pressures, the remainder of the desired operating pressure in addition to the hydrogen will be made up by the introduction of other gases such as nitrogen, carbon dioxide or helium whereby the desired operating pressure may be attained and maintained during the residence time of the reaction, said residence time being in a range of from about 0.5 up to about 10 hours or more in duration.

The aforementioned conversion reaction is effected in the presence of a catalyst containing gold. Generally speaking, the catalytic composition of matter comprises an auric compound deposited on a solid support in an amount so that the concentration of the gold will range from about 0.05 up to about 5% by weight of the finished catalyst. The catalyst is prepared by compositing a soluble auric salt such as auric chloride, auric bromide, auric cyanide, auric sulphate, etc. on a solid support which, in the preferred embodiment of the process, comprises a metal oxide. Examples of these metal oxides which may be used as catalyst supports for the gold compound will include alumina in its various forms such as $\alpha$-alumina, $\gamma$-alumina, $\eta$-alumina, $\theta$-alumina, silica, magnesia, zirconia, thoria, etc. or mixtures thereof including silica-alumina, silica-zirconia, alumina-silica-zirconia, alumina-silica-magnesia, etc. The preparation of the catalyst whereby the gold-containing compound is composited on the solid support may be effected in any manner known in the art, one such manner comprising forming an aqueous solution of the gold salt, admixing the solid support therewith and thereafter drying and calcining said support. In addition, it is also contemplated within the scope of this invention, that the catalytic composition of matter may, if so desired, also contain a relatively small amount, that is, less than 10% of the finished catalytic composite of an alkali metal or an alkali earth metal. These alkali metals such as sodium, potassium, lithium, rubidium, cesium, calcium, strontium, barium, etc. may also be admixed with the catalytic composite in the form of an aqueous solution and thereafter dried and calcined in the usual manner.

The process of this invention may be effected in any suitable manner and may comprise either a batch or continuous type operation. For example, when a batch type operation is used a quantity of the geminally substituted cycloalkane is charged to a reaction vessel which, in the preferred emodiment of this process, comprises an autoclave of the rotating or mixing type. The autoclave will contain a catalytic amount of the gold-containing catalyst such as gold composited on $\gamma$-alumina. The apparatus is sealed and the desired operating pressure is attained by charging a substantially inert gas such as nitrogen into the vessel, this gas also containing a predetermined amount of hydrogen which contributes a partial pressure and is added to prevent carbonization of the catalytic composite. Following this the apparatus is heated to the desired operating temperature which is above about 450° C. After subjecting the geminally substituted cycloalkane to these conversion conditions for a period of time ranging from about 0.5 up to about 10 hours or more in duration, heating is discontinued. After the reaction vessel and contents thereof have returned to room temperature the excess pressure is discharged, the autoclave is opened and the reaction mixture is recovered. After separation of the reaction mixture from the catalyst by conventional means such as filtration, the mixture is then subjected to purification and separation means which are well known in the art such as extraction, washing, drying, fractional crystallization, fractional distillation under reduced pressure, etc. whereby the substituted aromatic compounds containing the same number of carbon atoms as the starting material are recovered.

Another method of effecting the process of this invention is in a continual manner. When such a type of operation is utilized, the geminally substituted cycloalkane is continuously charged to the reaction vessel containing the desired gold-containing catalytic composition of matter and which is maintained at the proper operating conditions of temperature and pressure, said pressure, as hereinbefore set forth, being supplied by a partial pressure of hydrogen and the remainder a diluent gas such as nitrogen, carbon dioxide, helium, etc. After the predetermined residence time has elapsed the reactor effluent is continuously withdrawn and subjected to conventional means of separation whereby the substituted aromatic compounds containing the same number of carbon atoms as the starting material are separated from the unreacted geminally substituted cycloalkanes, the latter being recycled to form a portion of the feed stock while the former are separated and passed to storage.

Due to the physical nature of the catalytic composition of matter, especially when composited on a solid support, it is possible to effect the continuous type of operation in various specific ways. For example, it is possible to effect a continuous type of operation utilizing the catalyst as a fixed bed in the reactor. The geminally substituted cycloalkane will then be passed over this fixed bed of catalyst in either an upward or downward flow. Another type of operation which may be employed comprises a moving bed type of operation in which the catalyst and the reactant are passed through the reaction zone either concurrently or countercurrently to each other. A third type of operation which may be employed is the slurry type in which the catalytic composition of matter is carried into the reaction zone as a slurry in the geminally substituted cycloalkane.

Some specific examples of substituted aromatic compounds containing the same number of carbon atoms as the starting material which may be prepared according to the process of this invention will include o-xylene, ethylbenzene, 1,2-diethylbenzene, isobutylbenzene, ethylnaphthalene, 1,2-dimethylnaphthalene, 3-chloro-o-xylene, 3-chloro-o-diethylbenzene, 3-bromo-o-xylene, 3-bromo-o-diethylbenzene, 3-ethyltoluene, hemimellitene, pseudocumene, 1,2,3-trimethylnaphthalene, 3-methyl-1-ethylnaphthalene, etc.

The following examples are given to illustrate the process of the present invention which, however, are not intended to limit the general broad scope of the present invention in strict accordance therewith.

EXAMPLE I

A catalyst is prepared by compositing a sufficient amount of an aqueous solution of auric chloride and sodium chloride on γ-alumina so that the finished product after drying and calcination thereof at a temperature of about 1000° C. for a period of 6 hours will result in a catalytic composition of matter which contains 1% of gold and 1% of sodium by weight of the finished catalyst. Following this, 2 g. of this catalytic composition of matter is placed in the glass liner of a rotating autoclave and 56 g. (0.5 mole) of 1,1-dimethylcyclohexane is added thereto. The liner is sealed into the autoclave and a sufficient amount of a 1:1 mixture of hydrogen and nitrogen is pressed in until an initial pressure of 500 pounds per square inch is reached. The autoclave and contents thereof are then heated to a temperature of 500° C. and maintained thereat for a period of about 6 hours. At the end of this time heating is discontinued and the autoclave is allowed to return to room temperature. At room temperature the final pressure will be in excess of 500 pounds per square inch. This excess pressure is discharged, the autoclave is opened and the reaction mixture along with the catalyst is recovered. The organic layer is separated from the catalyst by filtration, extracted, the solvent is evaporated and the mixture is subjected to fractional distillation under reduced pressure, the desired products comprising ethylbenzene and o-xylene being recovered therefrom.

EXAMPLE II

In this example a catalyst similar in nature to that hereinbefore set forth is prepared by compositing an aqueous solution of auric sulphate on silica, thereafter drying and calcining the deposit at a temperature of 1000° C. for a period of 6 hours. The finished catalytic composition of matter will contain 1.5% by weight of gold. Thereafter 2 g. of this catalyst is placed in the glass liner of a rotating autoclave along with 70 g. (0.5 mole) of 1,1-diethylcyclohexane. The liner is sealed into the autoclave and a gas comprising a 1:1 ratio of nitrogen to hydrogen is pressed in until an initial pressure of 500 pounds per square inch is reached. The autoclave is then heated to a temperature of 500° C. and maintained thereat for a period of 6 hours during which time the pressure will rise to about 750 pounds per square inch. At the end of the 6 hour time period heating is discontinued and the autoclave is allowed to return to room temperature, the final pressure at room temperature being in excess of 500 pounds per square inch. The excess pressure is discharged from the autoclave and the reaction mixture is recovered therefrom. The catalyst is separated from the mixture by means of filtration, the latter then being subjected to a series of steps similar to that set forth in Example I above, the desired products comprising isobutylbenzene and 1,2-diethylbenzene are recovered from the fractional distillation step.

EXAMPLE III

A conversion catalyst is prepared by compositing a sufficient amount of an aqueous auric chloride solution and potassium chloride solution on γ-alumina so that the finished catalyst, after drying and calcination thereof will contain 0.8% of gold and 1% of potassium by weight of the finished composite. Following this 3 g. of this catalyst is placed in the glass liner of a rotating autoclave along with 83 g. (0.5 mole) of 1,1-dimethyldecahydronaphthalene. As in the previous examples, a mixture of nitrogen and hydrogen in a 1:1 ratio is charged to the sealed autoclave until an initial operating pressure of 500 pounds per square inch is reached. The autoclave is then heated to a temperature of 550° C. and maintained thereat for a period of 8 hours, the maximum pressure reaching approximately 800 pounds per square inch. At the end of the residence time heating is discontinued and the autoclave allowed to return to room temperature, the final pressure at room temperature being in excess of 500 pounds per square inch. This excess pressure is discharged, the autoclave is opened and the reaction mixture is recovered therefrom. After separation from the catalyst by means of filtration, the mixture is subjected to a series of purification steps similar to that set forth in Example I above, the desired products comprising ethylnaphthalene and 1,2-dimethylnaphthalene being recovered from the fractional distillation step.

I claim as my invention:

1. A process for the conversion of a geminally substituted cycloalkane to a substituted aromatic compound which comprises treating said alkane at a temperature in the range of from about 450° to about 600° C. and a pressure in the range of from about atmospheric to about 1,000 pounds per square inch in the presence of a gold-containing catalyst, and recovering the resultant substituted aromatic compounds.

2. The process as set forth in claim 1 in which said gold-containing catalyst contains an alkali or alkaline earth metal.

3. The process as set forth in claim 1 in which said gold-containing catalyst comprises gold composited on alumina.

4. The process as set forth in claim 1 in which said gold-containing catalyst comprises gold composited on silica.

5. The process as set forth in claim 1 in which said geminally substituted cycloalkane is 1,1-dimethylcyclohexane and said substituted aromatic compounds are ethylbenzene and o-xylene.

6. The process as set forth in claim in which said geminally substituted cycloalkane is 1,1-diethylcyclohexane and said substituted aromatic compounds are isobutylbenzene and 1,2-diethylbenzene.

7. The process as set forth in claim 1 in which said geminally substituted cycloalkane is 1,1-dimethyldecahydronaphthalene and said substituted aromatic compounds are ethylnaphthalene and 1,2-dimethylnaphthalene.

References Cited

UNITED STATES PATENTS 3,156,735   11/1964   Armstrong   260—668 D

FOREIGN PATENTS 1,032,754   6/1966   Great Britain.

OTHER REFERENCES

Erkelens et al., Trans. Faraday Soc., 59, 1181–91 (1963); Abs. at Chem. Abs. 59, 5820, Sept. 16, 1963.

Alchudzhan et al., Izv. Akad. Nauk Arm. SSR, Khim Nauki 17 (4), 368–74 (1964); Abs. at Chem. Abs. 61, 15985, Dec. 21, 1964.

Chambers et al., Journal of Catalysis 5, 517–28 (1966).

CURTIS R. DAVIS, Primary Examiner

U.S. Cl. X.R.

260—668 D